US012798769B2

(12) United States Patent
Methibay et al.

(10) Patent No.: US 12,798,769 B2
(45) Date of Patent: Nov. 17, 2026

(54) WIRE CUTTER SYSTEM

(71) Applicant: Tusas-Turk Havacilik Ve Uzay Sanayii Anonim Sirketi, Kahramankazan (TR)

(72) Inventors: Hayriye Ezgi Methibay, Kahramankazan (TR); Burhan Sahin, Kahramankazan (TR)

(73) Assignee: Tusas-Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 71 days.

(21) Appl. No.: 18/851,718

(22) PCT Filed: Mar. 28, 2023

(86) PCT No.: PCT/TR2023/050293

§ 371 (c)(1),
(2) Date: Sep. 27, 2024

(87) PCT Pub. No.: WO2023/191752

PCT Pub. Date: Oct. 5, 2023

(65) Prior Publication Data

US 2025/0361005 A1 Nov. 27, 2025

(30) Foreign Application Priority Data

Mar. 31, 2022 (TR) ............................... 2022/005071

(51) Int. Cl.
*B64C 27/00* (2006.01)

(52) U.S. Cl.
CPC .................................. *B64C 27/006* (2013.01)

(58) Field of Classification Search
CPC .............................. B64C 27/006; B64D 45/00
See application file for complete search history.

(56) References Cited

U.S. PATENT DOCUMENTS 2,984,834 A * 5/1961 Howard, Jr. ........... H01Q 1/428
343/705
4,215,833 A * 8/1980 Chan ..................... B64C 27/006
30/296.1
4,509,627 A * 4/1985 Kawamoto ........... F16D 43/284
192/105 A
4,759,186 A * 7/1988 Sugden ................... F15B 15/12
91/416
(Continued)

FOREIGN PATENT DOCUMENTS

CN 109533360 3/2019
KR 10-2042990 11/2019
(Continued)

OTHER PUBLICATIONS

International Search Report and the Written Opinion Dated Jul. 6, 2023 From the International Searching Authority Re. Application No. PCT/TR2023/050293. (10 Pages).

*Primary Examiner* — Joshua J Michener
*Assistant Examiner* — Michael B. Kreiner

(57) ABSTRACT

The present invention relates to a body (2) which is an air vehicle; at least one rotor (3) on the body (2), which allows the body (2) to move; at least one wire cutter on the body (2), which cuts various obstacles such as electrical wires or telephone cables contacting the body (2) while moving, and thus prevents the body (2) from getting damaged.

13 Claims, 4 Drawing Sheets

(56) References Cited

U.S. PATENT DOCUMENTS

| | | | | | |
|---|---|---|---|---|---|
| 4,826,103 | A * | 5/1989 | McKown | B64C 27/006 83/639.4 |
| 5,286,170 | A * | 2/1994 | Brannon | B64C 27/006 244/17.11 |
| 5,288,036 | A * | 2/1994 | Kompare | B64C 27/006 244/17.11 |
| 5,415,364 | A * | 5/1995 | Grant | B64C 27/006 244/17.11 |
| 5,927,648 | A * | 7/1999 | Woodland | B64D 7/00 244/129.1 |
| 8,902,112 | B2 * | 12/2014 | Dutruc | H01Q 1/44 343/705 |
| 9,114,873 | B2 * | 8/2015 | Claeys | B26D 3/08 |
| 9,132,301 | B2 * | 9/2015 | Jones | A62B 35/0093 |
| 9,694,904 | B2 * | 7/2017 | Hirons | B64C 27/006 |
| 9,725,165 | B2 * | 8/2017 | Smith | B26D 1/12 |
| 10,071,493 | B2 * | 9/2018 | Povroznik, III | B66D 1/54 |
| 10,969,256 | B2 * | 4/2021 | Parsons | B64D 43/00 |
| 12,036,619 | B2 * | 7/2024 | Lemke | B23D 29/002 |
| 2014/0054414 | A1 * | 2/2014 | Kosie | B64C 27/006 244/1 R |

FOREIGN PATENT DOCUMENTS

| | | |
|---|---|---|
| WO | WO 95/07214 | 3/1995 |
| WO | WO 2023/191752 | 10/2023 |

* cited by examiner

WIRE CUTTER SYSTEM

RELATED APPLICATIONS

This application is a National Phase of PCT Patent Application No. PCT/TR2023/050293 having International filing date of Mar. 28, 2023, which claims the benefit of priority of Turkey Patent Application No. 2022/005071 filed on Mar. 31, 2022. The contents of the above applications are all incorporated by reference as if fully set forth herein in their entirety.

FIELD AND BACKGROUND OF THE INVENTION

The present invention relates to a wire cutter system developed to prevent an air vehicle from being damaged by obstacles hit during a flight.

When an air vehicle, such as a helicopter used for civil or military purposes and flying at low altitudes, hits against obstacles such as hardly-visible electrical wires or telephone cables during flight, accidents may occur, resulting in an air vehicle crash. Wire cutter systems are provided on air vehicles to reduce the risk of obstacles, such as electrical wires or telephone cables, hitting and damaging the air vehicle. Wire cutters are designed individually for each air vehicle, which can be placed in different positions on the air vehicle, have high strength during a cable or wire cutting process, and have a minimal aerodynamic impact.

CN109533360A, which is included in the known-state of the art, discloses a telescopic wire cutter. Said wire cutter comprises a mounting bracket having a first angle guiding port and a second angle mounting port. Said mounting bracket is mounted under the helicopter fuselage. In addition to the bracket, the wire cutter comprises a cutting blade and several guiding pieces. The guiding pieces are structured telescopically, and open during the flight of the helicopter to cut the wire or cable.

KR102042990B1, which is included in the known-state of the art, discloses a wire cutting device mounted on a landing gear of a helicopter and moving with the landing gear, wherein if the helicopter is caught in a cable, such as a power cable, during landing, the wire cutting device cuts the cable to deploy the landing gears.

U.S. Pat. No. 5,286,170A, which is in the state of the art, discloses a wire cutting apparatus for helicopters. Specifically, it addresses systems that protect helicopters from potentially dangerous wire strikes by providing cutting mechanisms between the rotor and the fuselage. These mechanisms, which include pitch control rods with cutting edges and rotating drum assemblies, are designed to intercept and sever wires that might become entangled in the rotor, preventing crashes. The described systems work by directing the wire toward the midpoint of the cutting apparatus, either through helically twisted control rods or cutting blades on a drum, ensuring that the wire is cut before it can damage the helicopter.

SUMMARY OF THE INVENTION

A wire cutter system according to the present invention prevents the air vehicle from being damaged by cutting a wire when the air vehicle is caught in obstacles such as cables or wires. Moreover, since the wire cutter can move in and out of the body, when the air vehicle is positioned on the ground, wings of the air vehicle and the wire cutter are prevented from hitting each other in case the wings are bent due to weight or atmospheric conditions.

The wire cutter system realized to achieve the object of the present invention, which is illustrated in the first claim and other claims dependent thereon, comprises a body on the air vehicle; at least one rotor on the body, which allows the body to take off and move; at least one wire cutter which allows various obstacles such as electrical wires, telephone cables that the air vehicle hits during a flight to be cut before damaging the air vehicle.

The wire cutter system according to the invention comprises a first position (I) in which the wire cutter is triggered by the rotation of the rotor around its own axis, such that the wire cutter extends outward from the body and cuts the obstacles such as cables contained in the flight direction of the air vehicle; a second position (II) in which the wire cutter is retracted into the body from the first position (I) and does not extend outward from the body; at least one actuator that enables the wire cutter to move from the first position (I) to the second position (II) or from the second position (II) to the first position (I).

In an embodiment of the invention, the wire cutter system comprises the first position (I) in which the wire cutter extends outward from the body if the rotational speed of the rotor around its own axis is higher than a reference value determined by the manufacturer; a second position in which the wire cutter is moved from the first position (I) into the body if the rotational speed of the rotor around its own axis is lower than the reference value determined by the manufacturer.

In an embodiment of the invention, the wire cutter system comprises at least one sensor on the body, which reads the data on the rotational speed of the rotor around its own axis; a control unit which receives data from the sensor to compare the data read by the sensor with the reference value determined by the manufacturer; the control unit that triggers the actuator to move the wire cutter to the first position (I) or the second position (II) according to the rotor speed and the reference value.

In an embodiment of the invention, the wire cutter system comprises a pulley on the body; a belt that moves the pulley and provides the connection between rotor and pulley; a first chamber containing liquid or gas; the actuator movably located on the pulley; a second chamber in which a lower surface of the wire cutter is movably located; a conveying line that allows the fluid in the first chamber to be transported into the second chamber; the actuator, which moves into the first chamber on the pulley with the rotational speed of the rotor, thus applying force to the lower surface of the wire cutter by fluids carried into the second chamber, allowing the wire cutter to move from the second position (II) to the first position (I).

In an embodiment of the invention, the wire cutter system comprises the actuator that enables the wire cutter to move to the first position (I) or the second position (II) when the pilot provides an input to the control unit.

In an embodiment of the invention, the wire cutter system comprises the actuator rotating around an axis where the wire cutter extends to the wings, thus moving the wire cutter from the first position (I) to the second position (II) or from the second position (II) to the first position (I).

In an embodiment of the invention, the wire cutter system comprises the body located on a rotary wing air vehicle; at least one body surface located on the body and facing with the wings; the wire cutter extending from the body surface to the wings in the first position (I).

In an embodiment of the invention, the wire cutter system comprises a connector which enables the wire cutter to be rotatably attached to the body and to rotate from the first position (I) to the second position (II) or from the second position (II) to the first position (I) around the connection point on the body.

In an embodiment of the invention, the wire cutter system comprises an outer surface located on the wire cutter and complementary to the body surface so that it does not protrude from the wire cutter body surface when the wire cutter is in the second position (II).

In an embodiment of the invention, the wire cutter system comprises the wire cutter located between the body and the landing gears.

In an embodiment of the invention, the wire cutter system comprises the wire cutter extending from the body to the landing gears.

In an embodiment of the invention, the wire cutter system comprises the actuator which is an electric motor.

In an embodiment of the invention, the wire cutter system comprises the body located on the helicopter.

In an embodiment of the invention, the wire cutter system comprises a deflector on the body, which is triggered by the actuator to guide the cables moved to the first position (I) or the second position (II) on the body without cutting the cables.

All the parts illustrated in figures are individually assigned a reference numeral and the corresponding terms of these numbers are listed below:

A wire cutter system realized to achieve the object of the present invention is illustrated in the attached drawings, in which:

DESCRIPTION OF SPECIFIC EMBODIMENTS OF THE INVENTION

Figure 1:
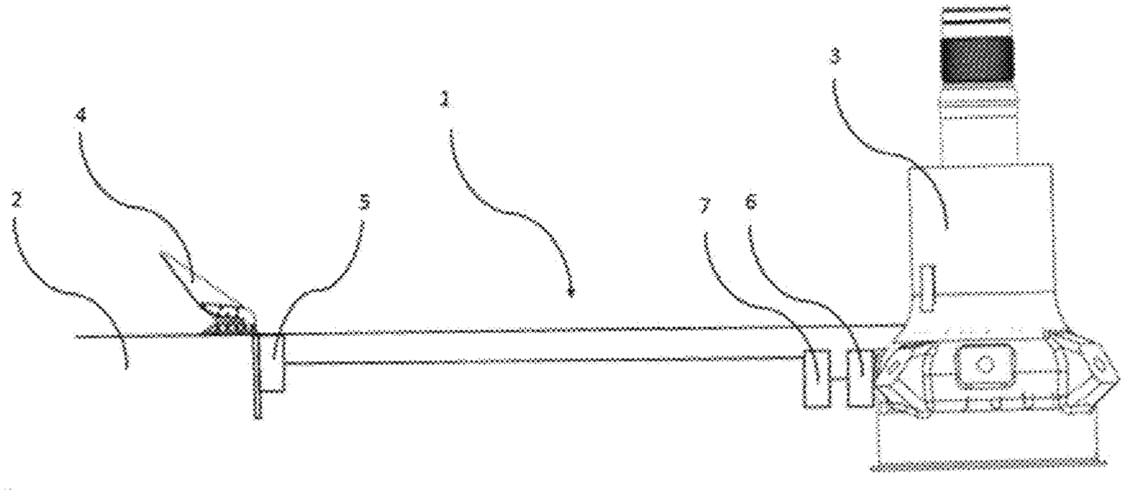
FIG. 1 is a side view of the wire cutter in the first position (I).

All the parts illustrated in figures are individually assigned a reference numeral and the corresponding terms of these numbers are listed below:

1. Wire Cutter System
2. Body
3. Rotor
4. Wire Cutter
5. Actuator
6. Sensor
7. Control Unit
8. Pulley
9. Belt
10. First Chamber
11. Second Chamber
12. Conveying Line
13. Body Surface
14. Connector
15. Outer Surface
16. Deflector
(I) First Position
(II) Second Position
(S) Lower Surface The wire cutter system (1) comprises a body (2) which is an air vehicle; at least one rotor (3) on the body (2), which allows the body (2) to move; at least one wire cutter on the body (2), which cuts various obstacles such as electrical wires or telephone cables contacting the body (2) while moving, and thus prevents the body (2) from getting damaged.

Figure 2:
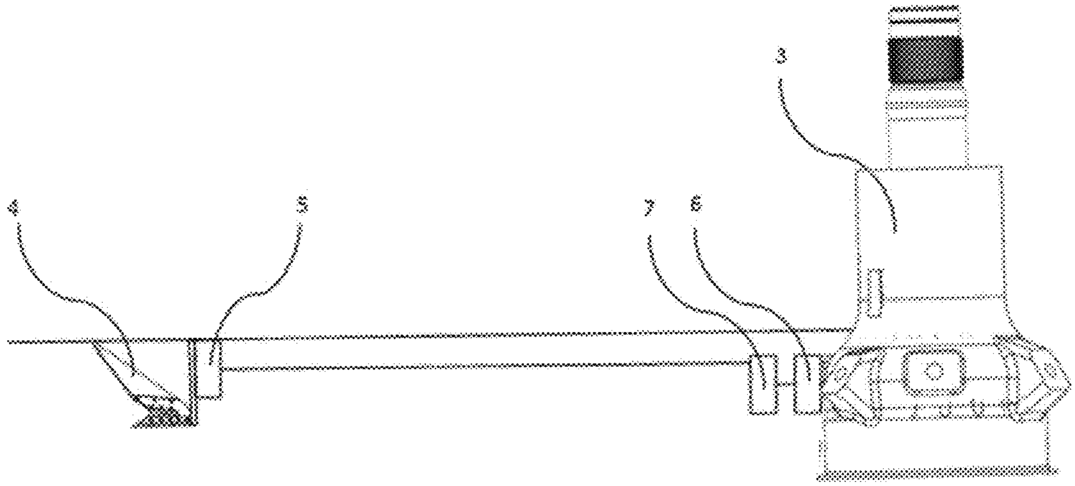
FIG. 2 is a side view of the wire cutter in the second position (II).
Figure 6:
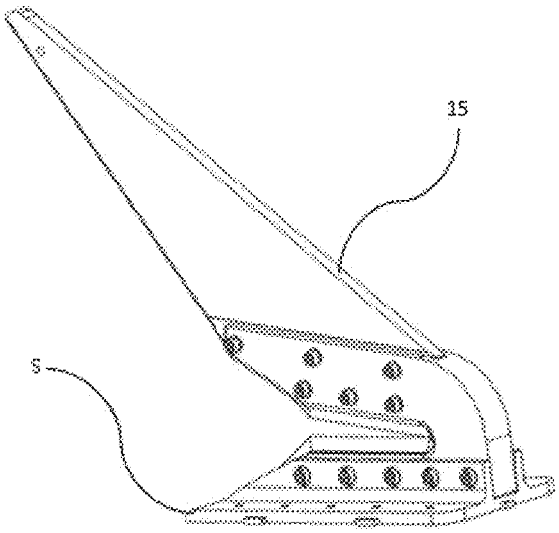
FIG. 6 is a perspective view of the wire cutter.
Figure 7:
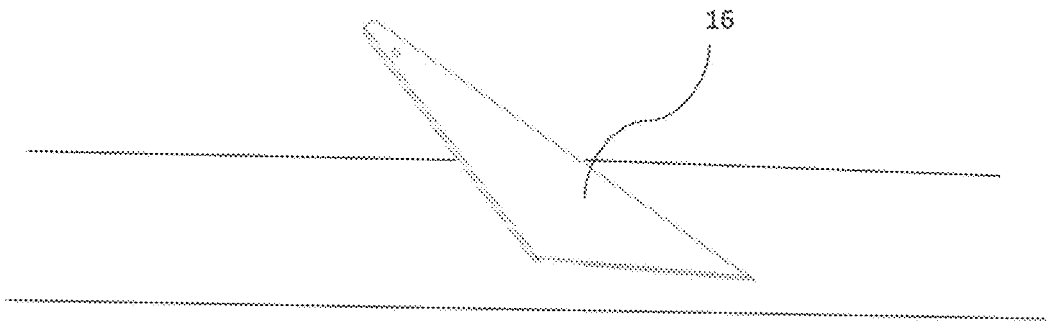
FIG. 7 is a side view of the deflector.

The wire cutter system (1) according to the invention comprises a first position (I) in which the wire cutter (4) is triggered by the rotation of the rotor (3) around its own axis, such that the wire cutter (4) extends outward from the body (2) and cuts the obstacles contacting the body (2); a second position (II) in which the wire cutter (4) is moved from the first position (I) by the rotation of the rotor (3) around its own axis, and kept in the body (2); at least one actuator (5) that provides the movement of the wire cutter (4) from the first position (I) to the second position (II) and from the second position (II) to the first position (I) (FIG. 1, FIG. 2, FIG. 6).

Hardly-visible obstacles such as cables or wires, which are not noticed by the user during the movement of the body (2), cause the air vehicle to crash. By means of the wire cutter (4) positioned on the body (2), cables and wires are cut before damaging the body (2). In this way, the flight safety of the air vehicle is enhanced.

Since the wire cutter (4) is provided on the body (2) so as to be movable from the first position (I) to the second position (II), the air vehicle wings are prevented from colliding with the wire cutter (4) as a result of bending due to atmospheric conditions or weight. As the movement of the wire cutter (4) from the second position (II) to the first position (I) depends on the rotational speed of the rotor (3), the wire cutter (4) is enabled to extend out of the body (2) only during the flight of the air vehicle.

In an embodiment of the invention, the wire cutter system (1) comprises the first position (I) in which the wire cutter (4) extends outward from the body (2) to cut the obstacles contacting the wire cutter (4) when the rotational speed of the rotor (3) is higher than a value predetermined by the manufacturer; the second position (II) in which the wire cutter (4) is moved from the first position (I) and kept in the body (2) if the rotational speed of the rotor (3) is lower than the value predetermined by the manufacturer. When the rotational speed of the rotor (3) is above the value determined by the manufacturer, the air vehicle wings bend less. Since the wire cutter (4) is in the first position (I) on the body (2) only when the rotational speed of the rotor (3) determined by the manufacturer is exceeded, it can extend over the body (2) to a closer distance to the wings in the first position (I). In this way, the body (2) can be further protected against obstacles.

In an embodiment of the invention, the wire cutter system (1) comprises at least one sensor (6) on the body (2), which obtains the data on the rotational speed of the rotor (3); a control unit (7) which compares the data received from the sensor (6) with the rotational speed of the rotor (3) determined by the manufacturer, and which, according to the rotational speed of the rotor (3) determined by the manufacturer, triggers the actuator (5) to move the wire cutter (4) from the first position (I) to the second position (II) or from the second position (II) to the first position (I). As a result that the control unit (7) processes and compares the data transmitted by the sensor (6) with the rotational speed of the rotor (3) determined by the manufacturer, the wire cutter (4) can move automatically from the first position (I) to the second position (II) or from the second position (II) to the first position (I) (FIG. 1, FIG. 2).

Figure 3:
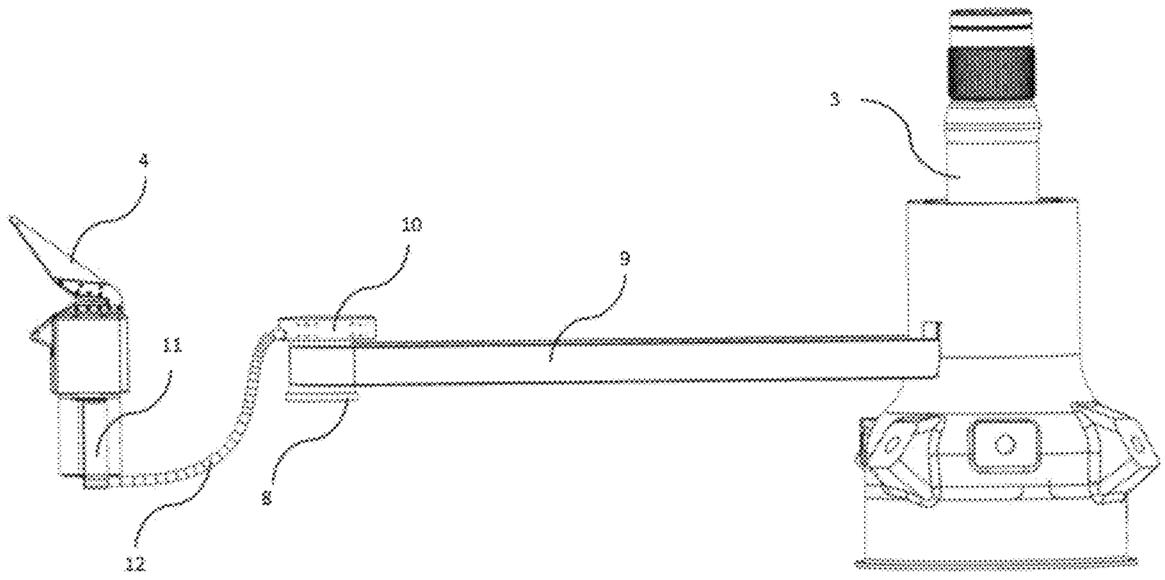
FIG. 3 is a side view of the belt, pulley, conveying system, first chamber and second chamber.

In an embodiment of the invention, the wire cutter system (1) comprises a pulley (8) on the body (2); a belt (9) that transfers the rotational movement of the rotor (3) to the pulley (8); a first chamber (10) containing a fluid; the actuator (5) which is located on the pulley (8) and moves into the first chamber (10) with the centrifugal force created by the rotational movement of the pulley (8); a second chamber (11) that allows application of force to a lower surface (S) of the wire cutter (4) by means of the fluids contained therein; a conveying line (12) that allows the wire cutter (4) to move from the second position (II) to the first position (I) by carrying fluid from the first chamber (10) to the second chamber (11) by means of the actuator (5) moving into the first chamber (10). Thanks to the belt (9) and pulley (8) system provided on the body (2) and triggered by the rotor (3), the rotational speed of the rotor (3) is transmitted mechanically to the actuator (5), and thus the wire cutter (4) can be activated without using electronic systems (FIG. 3).

In an embodiment of the invention, the wire cutter system (1) comprises the body (2) which is a rotary wing air vehicle; at least one body surface (13) where the body (2) is opposite to the wings; the wire cutter (4) extending from the body surface (13) to the wings in the first position (I). Therefore, it is ensured that the wings on the body (2) continue to operate without being damaged by obstacles during flight (FIG. 4).

Figure 4:
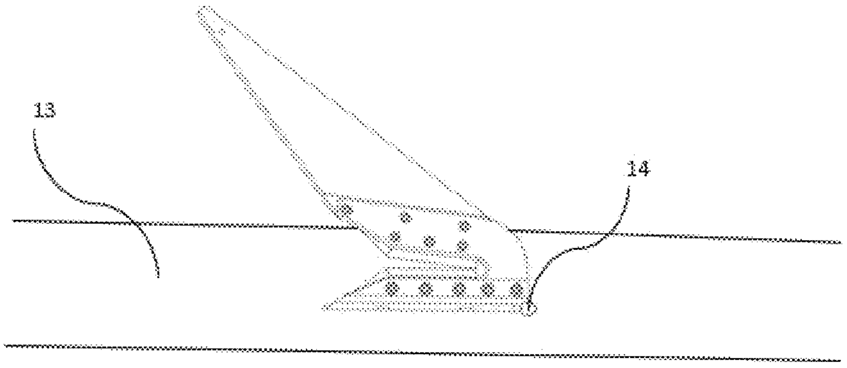
FIG. 4 is a side view of the wire cutter, body surface and connector.
Figure 5:
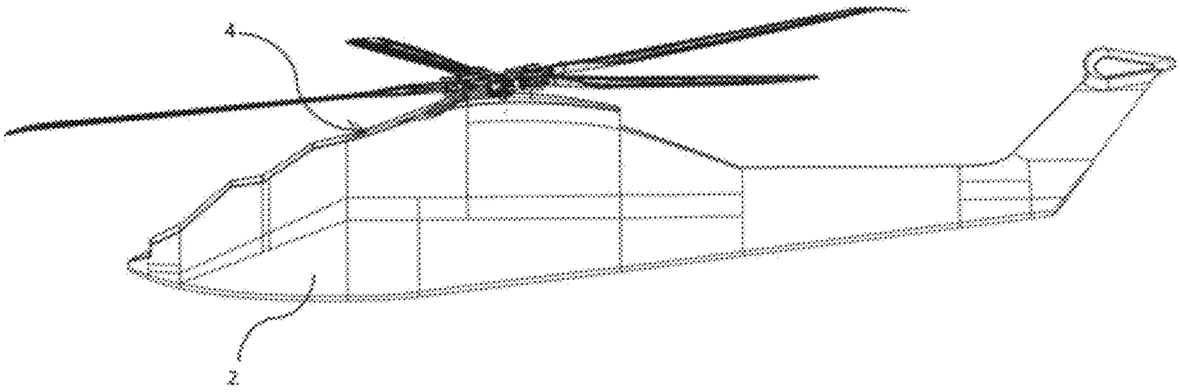
FIG. 5 is a side view of the body.

In an embodiment of the invention, the wire cutter system (1) comprises a connector (14) which enables the wire cutter (4) to be movably attached to the body (2); the wire cutter (4) that moves from the first position (I) to the second position (II) or from the second position (II) to the first position (I) by rotating around the connector (14) (FIG. 4).

In an embodiment of the invention, the wire cutter system (1) comprises the control unit (7) that enables the wire cutter (4) to move to the first position (I) or the second position (II) by triggering the actuator (5) with the input provided by the user. Therefore, the wire cutter (4) can be moved depending on the user's request.

In an embodiment of the invention, the wire cutter system (1) comprises the wire cutter (4) that is moved from the first position (I) to the second position (II) or from the second position (II) to the first position (I) by rotating around its own axis by means of the actuator (5).

In an embodiment of the invention, the wire cutter system (1) comprises an outer surface (15) on the wire cutter (4), which remains congruent with the body surface (13) when the wire cutter (4) is in the second position (II). Since the outer surface (15) remains congruent with the body surface (13), the wire cutter (4) is enabled to form a more aerodynamic surface in the second position (II) without protruding on the body (2) (FIG. 6).

In an embodiment of the invention, the wire cutter system (1) comprises the wire cutter (4) located between the body (2) and the landing gears. In an embodiment of the invention, the wire cutter system (1) comprises the actuator (5), which is an electric motor.

In an embodiment of the invention, the wire cutter system (1) comprises the body (2), which is a helicopter.

In an embodiment of the invention, the wire cutter system (1) comprises a deflector (16) on the body (2), which is triggered by the actuator (5) to guide the cables moved to the first position (I) or the second position (II) on the body (2) without cutting the cables. In this way, the cables can be guided to the wire cutters (4) without being stuck on the body (2).

The invention claimed is:

1. A wire cutter system comprising a body which is an air vehicle; at least one rotor on the body, which allows the body to move; at least one wire cutter on the body, which cuts various obstacles such as electrical wires or telephone cables contacting the body while moving, and thus prevents the body from getting damaged, wherein a first position in which the wire cutter is triggered by the rotation of the rotor around its own axis, such that the wire cutter extends outward from the body and cuts the obstacles contacting the body; a second position in which the wire cutter is moved from the first position by the rotation of the rotor around its own axis, and kept in the body; at least one actuator that provides the movement of the wire cutter from the first position to the second position and from the second position to the first position.

2. A wire cutter system according to claim 1, wherein the first position in which the wire cutter extends outward from the body to cut the obstacles contacting the wire cutter when the rotational speed of the rotor is higher than a value predetermined by the manufacturer; the second position in which the wire cutter is moved from the first position and kept in the body if the rotational speed of the rotor is lower than the value predetermined by the manufacturer.

3. A wire cutter system according to claim 1, wherein at least one sensor on the body, which obtains the data on the rotational speed of the rotor; a control unit which compares the data received from the sensor with the rotational speed of the rotor determined by the manufacturer, and which, according to the rotational speed of the rotor determined by the manufacturer, triggers the actuator to move the wire cutter from the first position to the second position or from the second position to the first position.

4. A wire cutter system according to claim 3, wherein the control unit that enables the wire cutter to move to the first position or the second position by triggering the actuator with the input provided by the user.

5. A wire cutter system (1) according to claim 1, wherein a pulley on the body; a belt that transfers the rotational movement of the rotor to the pulley; a first chamber containing a fluid; the actuator which is located on the pulley and moves into the first chamber with the centrifugal force created by the rotational movement of the pulley; a second chamber that allows application of force to a lower surface of the wire cutter by means of the fluids contained therein; a conveying line that allows the wire cutter to move from the second position to the first position by carrying fluid from the first chamber to the second chamber by means of the actuator moving into the first chamber.

6. A wire cutter system according to claim 1, wherein the body which is a rotary wing air vehicle; at least one body surface (13) where the body (2) is opposite to the wings; the wire cutter (4) extending from the body surface (13) to the wings in the first position (I).

7. A wire cutter system according to claim 6, wherein an outer surface on the wire cutter, which remains congruent with the body surface when the wire cutter is in the second position.

8. A wire cutter system (1) according to claim 1, wherein a connector which enables the wire cutter to be movably attached to the body; the wire cutter that moves from the first position to the second position or from the second position to the first position by rotating around the connector.

9. A wire cutter system according to claim 1, wherein the wire cutter that is moved from the first position to the second position or from the second position to the first position (I) by rotating around its own axis by means of the actuator (5).

10. A wire cutter system according to claim 1, wherein the wire cutter located between the body and the landing gears.

11. A wire cutter system according to claim 1, wherein the actuator, which is an electric motor.

12. A wire cutter system according to claim 1, wherein the body, which is a helicopter.

13. A wire cutter system according to claim 1, wherein a deflector on the body, which is triggered by the actuator to guide the cables moved to the first position or the second position on the body without cutting the cables.

* * * * *